United States Patent [19]

Eck et al.

[11] 4,263,191

[45] Apr. 21, 1981

[54] ADDITIVE COMPOSITION USED IN THE PREPARATION OF LOW AIR PORE, PLASTIC CONTAINING, HYDRAULICALLY-SETTING BINDERS

[75] Inventors: Herbert Eck; Paul-Gerhard Kirst; Wilhelm Lechner, all of Burghausen, Fed. Rep. of Germany

[73] Assignee: Wacker-Chemie GmbH, Munich, Fed. Rep. of Germany

[21] Appl. No.: 40,770

[22] Filed: May 21, 1979

[30] Foreign Application Priority Data

May 23, 1978 [DE] Fed. Rep. of Germany ....... 2822357

[51] Int. Cl.$^3$ .................. C04B 13/26; C08K 3/36; C08L 83/06
[52] U.S. Cl. ............... 260/29.6 S; 260/29.6 T; 260/29.6 NR; 106/90; 106/98; 106/100
[58] Field of Search .......... 260/29.6 S, 29.6 T, 260/29.6 ME, 29.6 M, 29.6 NR; 106/90, 98, 100

[56] References Cited

U.S. PATENT DOCUMENTS

| | | | |
|---|---|---|---|
| 3,377,306 | 4/1968 | Hyde ................... | 260/29.2 M |
| 3,390,109 | 6/1968 | Reverdin et al. ........... | 106/90 |
| 3,756,972 | 9/1973 | Kobayashi et al. ........... | 260/29.2 M |
| 3,833,530 | 9/1974 | Wicht et al. ............... | 260/29.6 S |

FOREIGN PATENT DOCUMENTS

1471100 3/1969 Fed. Rep. of Germany.
2403444 8/1975 Fed. Rep. of Germany.

*Primary Examiner*—V. P. Hoke
*Attorney, Agent, or Firm*—Hammond, Littell, Weissenberger and Muserlian

[57] ABSTRACT

An additive composition used in the preparation of low air pore, plastic-containing, hydraulically-setting binders consisting essentially of a mixture of (1) an aqueous copolymer dispersion having a solids content of between 30% and 65% by weight, a glass transition temperature of the solid copolymer of between $-10°$ C. and $+40°$ C., and a K-value of the solid copolymer of from 35 to 80, which aqueous copolymer dispersion being produced from monomer units of vinyl chloride, vinyl acetate and one or more additional copolymerizable monomers selected from the group consisting of ethylene, vinyl alkanoates having from 8 to 18 carbon atoms in the alkanoyl, and (meth)acrylic acid esters with alkanols having 3 to 8 carbon atoms, by free-radical polymerization in the presence of from 1.5% to 5% by weight of protective colloids and from 0 to 3% by weight of nonionic surface-active agents, both based on the dispersion, with (2) from 0.3% to 3% by weight, based on the mixture of a defoamer mixture consisting of 5 to 50 parts out of 100 parts of a dimethyl polysiloxane with 50 to 1000 mPa's,
1 to 10 parts out of 100 parts of a flame-hydrolyzed silicon dioxide, and
49 to 94 parts out of 100 parts of an ethylene/oxide propylene oxide block copolymer with a molecular weight of from 500 to 10,000, containing from 10% to 60% by weight of ethylene oxide units. With the above additive composition, it is now possible to produce hydraulically setting, plastic-containing binding materials which have a very low content of air-filled pores, and thus give better strength values of the set, plastic-containing, hydraulically-setting binding materials.

2 Claims, No Drawings

ADDITIVE COMPOSITION USED IN THE PREPARATION OF LOW AIR PORE, PLASTIC CONTAINING, HYDRAULICALLY-SETTING BINDERS

BACKGROUND OF THE INVENTION

When plastic dispersions are added to hydraulically-setting compositions, such as concrete and mortar compositions, foam is frequently formed on mixing, due to the emulsifier content of the plastic dispersion. The air introduced into the mixture can no longer escape, so that the final strength of the material when set is reduced by the great number of air-filled pores. For this reason anti-foaming agents or defoaming agents are added to the compositions to be mixed. These are mixtures of addition products of ethylene oxide onto alkylphenols, fatty alcohols, fatty amines or fatty acids. These anti-foaming agents are not very effective, even when they are added in large quantities. Other known anti-foaming agents are for example, tertiary esters of o-phosphoric acid, however, on the basis of their chemical constitution, these agents are toxic.

In German publish application, DOS No. 24 03 444, abstracted in Chem. Abstracts 83, 197362$_n$ (1975), there is mentioned as anti-foaming agents, mixtures based on alkoxylated fatty alcohols containing 12 to 22 carbon atoms and alkoxylated products of other substances with these alkoxylated fatty alcohols which are obtained by the addition of propylene oxide onto the fatty alcohols. Dispersions produced with these anti-foaming agents are stable in storage, but the anti-foaming agent loses much of its ability to defoam after mechanical stress, that is, after prolonged mixing periods either of the dispersion or of the unset mortar or concrete.

German published application DOS No. 14 71 100, corresponding to U.S. Pat. No. 3,228,907, describes as an anti-foaming agent a dimethylpolysiloxane/silica/aerogel emulsion, which likewise loses much of its ability to defoam after mechanical stress.

OBJECTS OF THE INVENTION

An object of the invention was therefore to find additives for the production of low air pore, plastic-containing, hydraulically-setting binding compositions whose content of air-filled pores remains low, even after prolong mechanical stress of either the plastic dispersion or the unset mortar or concrete.

Another object of the present invention is the development of an additive composition used in the preparation of low air pore, plastic-containing, hydraulically-setting binders consisting essentially of a mixture of (1) an aqueous copolymer dispersion having a solids content of between 30% and 65% by weight, a glass transition temperature of the solid copolymer of between −10° C. and +40° C., and a K-value of the solid copolymer of from 35 to 80, which aqueous copolymer dispersion being produced from monomer units of vinyl chloride, vinyl acetate and one or more additional copolymerizable monomers selected from the group consisting of ethylene, vinyl alkanoates having from 8 to 18 carbon atoms in the alkanoyl, and (meth)acrylic acid esters with alkanols having 3 to 8 carbon atoms, by free-radical polymerization in the presence of from 1.5% to 5% by weight of protective colloids and from 0 to 3% by weight of nonionic surface-active agents, both based on the dispersion, with (2) from 0.3% to 3% by weight, based on the mixture of a defoamer mixture consisting of 5 to 50 parts out of 100 parts of a dimethyl polysiloxane with 50 to 1000 mPa's, 1 to 10 parts out of 100 parts of a flame-hydrolyzed silicon dioxide, and 49 to 94 parts out of 100 parts of an ethylene oxide/propylene oxide block copolymer with a molecular weight of from 500 to 10,000, containing from 10% to 60 by weight of ethylene oxide units.

These and other objects of the present invention will become more apparent as the description thereof proceeds.

DESCRIPTION OF THE INVENTION

The subject of the present invention is an additive for the production of low air-pore, plastic-containing, hydraulically-setting binding compositions, consisting of aqueous plastic dispersions and anti-foaming agents, which is characterized in that the additive is a mixture of (1) an aqueous copolymer dispersion with a solids content of between 30% and 65% by weight, a glass transition temperature of the resin of between −10° C. and +40° C. and a K-value of the resin of 35 to 80, containing monomer units of vinyl chloride, vinyl acetate and one or more additional copolymerizable monomers of the group of ethylene, vinyl esters of branched or unbranched carboxylic acids with 8 to 18 carbon atoms and acrylic esters with aliphatic alcohols with 3 to 8 carbon atoms obtained by free-radical polymerization in the presence of common protective colloids in amounts of 1.5% to 5% by weight, and nonionic surface-active compounds up to 3% by weight, each related to the dispersion, and (2) from 0.3% to 3% by weight, related to the dispersion, of anti-foaming agent consisting of 5 to 50 parts of dimethylpolysiloxane with 50 to 1000 mPa's, 1 to 10 parts of flame-hydrolyzed silicon dioxide, as well as 49 to 94 parts of an ethylene oxide-propylene oxide block copolymer with a molecular weight of 500 to 10,000 containing 10 to 60% by weight of ethylene oxide in the block polymer, where the anti-foaming agent and the copolymer dispersion are mixed with each other before they are added to the hydraulically-setting binding material.

More particularly, the present invention relates to an additive composition used in the preparation of low air pore, plastic-containing, hydraulically-setting binders consisting essentially of a mixture of (1) an aqueous copolymer dispersion having a solids content of between 30% and 65% by weight, a glass transition temperature of the solid copolymer of between −10° C. and +40° C., and a K-value of the solid copolymer of from 35 to 80, which aqueous copolymer dispersion being produced from monomer units of vinyl chloride, vinyl acetate and one or more additional copolymerizable monomers selected from the group consisting of ethylene, vinyl alkanoates having from 8 to 18 carbon atoms in the alkanoyl, and (meth)acrylic acid esters with alkanols having 3 to 8 carbon atoms, by free-radical polymerization in the presence of from 1.5% to 5% by weight of protective colloids and from 0 to 3% by weight of nonionic surface-active agents, both based on the dispersion, with (2) from 0.3% to 3% by weight, based on the mixture of a defoamer mixture consisting of 5 to 50 parts out of 100 parts of a dimethyl polysiloxane with 50 to 1000 mPa's, 1 to 10 parts out of 100 parts of a flame-hydrolyzed silicon dioxide, and 49 to 94 parts out of 100 parts of an ethylene oxide/propylene oxide block copolymer with a molecular weight of from 500 to 10,000, containing from 10% to 60% by weight of ethylene oxide units.

Another subject of the invention is the use of the additive composition of the invention in amounts of from 1% to 50% by weight, based on the hydraulic binder in the hydraulically-setting binding materials.

Surprisingly it is possible with the additive mixture according to the invention to obtain, even after prolong mixing, hydraulically-setting, plastic-containing binding materials which have a lower content of air-filled pores than it was possible heretofore according to the state of the art. In addition, the components contained in the additive composition are relatively non-toxic and the additive is stable in storage.

The advantage of the use of copolymer dispersions of vinyl chloride, vinyl acetate and at least one other monomer copolymerizable with vinyl acetate and vinyl chloride in amounts of 1% to 50% by weight based on the hydraulically-setting material in hydraulically-setting binding materials resides in their alkaline resistance and the imparting to the set material of increased bending resistance and abrasion resistance.

The copolymer dispersions used in the additive consist substantially of vinyl chloride (VC) and vinyl acetate (VAc) and of another copolymerizable monomer of the group ethylene (E), vinyl esters of branched or unbranched carboxylic (alkanoic) acids with 8 to 18 carbon atoms such as vinyl laurate (VL), vinyl Versatate ® with 9 to 11 or 15 to 18 carbon atoms, in the Versatic acid moiety, or vinyl esters of mixtures of tert. aliphatic carboxylic acids, and vinyl isononanate (INV) as well as (meth)acrylic esters with aliphatic alcohols (alkanols) with 3 to 8 carbon atoms, such as n-propyl acrylate (PA), n-butyl acrylate (BA) and ethylhexyl acrylate (EHA). The polymerization is effected under stirring in the presence of protective colloids and nonionic surface-active compounds or emulsifiers, if necessary, using free-radical-forming catalysts. Suitable as protective colloids are completely or partly hydrolyzed water-soluble polyvinyl acetate, polyvinyl pyrrolidone or cellulose derivatives. The protective colloids are used in amounts of 1.5% to 5% by weight, preferably 2% to 4% by weight, based on the total dispersion. With saponified polyvinyl acetate, products with a saponification number of 20 to 220 and a Hoeppler viscosity between 3 to 40 mPa's preferably between 4 and 30 mPa's (of the 4% aqueous solution at 20° C.) are preferred. The nonionic emulsifiers which are optionally used, are preferably mono-ethers or mono-esters of higher fatty alcohols or higher fatty acids with polyoxyethylene glycol. They can be used in amounts of up to 3% by weight, based on the total dispersion. Suitable are also the mono-ethers of alkylphenols, such as nonylphenol, with polyoxyethylene glycol and long-chained fatty acid mono-esters of polyhydric alkanols, e.g., sorbitol monooleate, and fatty acid alkanol amides.

Free-radical-forming catalysts are sufficiently known. They can consist of single compounds or contain several compounds which act in combination as a system and which can be soluble in water or in oil. Suitable are, for example, the organic and inorganic peroxides, persulfates, dialkyl percarbonates, azo-compounds and redox systems, e.g. potassium or ammonium persulfate/sodium metabisulfite and/or sodiumformaldehyde sulfoxylate.

Activators for the catalyst can also be used in the catalyst system. Suitable are, for example, traces of transition metal salts, such as iron (II) sulfate. Chain transfer agents or molecular weight regulators can also be useful in the polymerization process. Suitable are long-chained water-insoluble, aliphatic mercaptans, such as n-dodecyl mercaptan or tert.-dodecyl-mercaptan. In order to increase the molecular weight, difunctional monomers, such as divinyl succinate, ethylene glycol dimethacrylate, allyl methacrylate or triallyl cyanurate, can be used in amounts of from 0 up to 0.5% by weight, preferably from 0 up to 0.2% by weight, based on the total.

The production conditions do not differ from those commonly used in corresponding copolymerizations of aqueous dispersions. Depending on the catalyst system used, the polymerization temperature is between 0° C. and 90° C., preferably between 20° C. and 90° C. for economical reasons. In ethylene-containing dispersions, the polymerization temperature is not above 55° C. because of the otherwise required high pressure. The ethylene pressure is between 3 and 150 excess atm., depending on the desired composition of the resin and the temperature applied.

A typical dispersion has the following composition:

20% to 80% by weight, preferably 20% to 70% by weight, of vinyl chloride,

5% to 75% by weight, preferably 10% to 75% by weight, vinyl acetate, and

5% to 30% by weight, preferably 5% to 25% by weight of ethylene, or

10% to 60% by weight, preferably 20% to 50% by weight, of another monomer which is copolymerizable with vinyl chloride and vinyl acetate, such as vinyl esters of branched or unbranched carboxylic acids, with 8 to 18 carbon atoms or (meth)acrylic esters with aliphatic alcohols with 3 to 8 carbon atoms. In addition the dispersion contains from 1.5% to 5% by weight, preferably 2% to 4% by weight, related to the dispersion of a protective colloid, such as polyvinyl alcohol and 0 to 3% by weight, related to the dispersion, of a nonionic emulsifier.

After the polymerization, 0.3% to 3% by weight, preferably 0.5% to 2% by weight, related to the dispersion of a defoamer mixture of 5% to 50% by weight of a dimethylpolysiloxane with a viscosity of 50 to 1000 mPa's 1% to 10% by weight, preferably 2% to 8% by weight, of a flame-hydrolyzed silicon dioxide, and 50% to 95% by weight of a polyethylene oxide/polypropylene oxide block copolymer with a molecular weight of 500 to 10,000 preferably 1000 to 6000, containing 10% to 60% by weight, preferably 15% to 45% by weight of ethylene oxide units in the block copolymer, are added to the finished dispersion. The total amount of the dimethylpolysiloxane in the finished additive for hydraulically-setting binding materials should be between 0.03% and 0.5% by weight, preferably 0.05% to 0.3% by weight, related to the dispersion. The flame-hydrolyzed silicon dioxide is preferably mixed with the dimethylpolysiloxane prior to its admixture with the dispersion. The flame-hydrolyzed silicon dioxide is an extremely finely-divided material in sub-micron sizes prepared by subjecting silica to an electric arc at temperatures of about 3,000° C., often referred too as silica fume. The polyethylene oxide/polypropylene oxide block copolymer should be contained in the finished additive in an amount of 0.3% to 4% by weight, preferably 0.5% to 2% by weight, based on the dispersion.

The additive mixture consisting of dispersion and anti-foaming agent is added to the hydraulic binder in the amount of 1% to 50% by weight, preferably 10% to 40% by weight, based on the cement content or the hydraulic binder content in the concrete or mortar. Apart from concrete and mortar mixtures, lime and plaster mixtures without cement are also included in those hydraulically-setting materials.

The dimethylpolysiloxanes or the flame-hydrolyzed silicon dioxide contained in the anti-foaming agent, as well as the polyethylene oxide/polypropylene oxide block copolymer are commercially available. Particularly the ethylene oxide/propylene oxide block copolymers can be satisfied not only with hydroxyl end groups, but also with other end groups, like methoxy, ethoxy, propoxy, or acetyloxy groups. Determinant for the action of the additive on the hydraulically-setting binding material is that the anti-foam combination is mixed with the dispersion before the hydraulically binding composition is added to the dispersion. The resulting additive compositions are stable in storage. Separate addition of the polymer dispersion and of the anti-foam combination to the hydraulically binding material has a slightly less pore-reducing effect in the hydraulically-setting binding composition.

The following examples are illustrative of the practice of the invention without being limitative in any respect.

EXAMPLES D1 to D26

General method for the preparation of the dispersions for the additive Examples A1 to A26

The polyvinyl alcohol solution, the optionally-present nonionic emulsifier (isotridecanol etherified with 15 ethylene oxide units), the total amount of oxidant (potassium persulfate about 0.3%, based on the dispersion), as well as a small amount of ferro-ammonium sulfate (about $0.4 \times 10^{-3}\%$) were stirred or dissolved in the charged water. The pH-value was standardized with formic acid to a value of 3 to 3.5 thereafter the mixture was heated to the desired reaction temperature (35° C. to 50° C., except in Examples 22 to 24, 25° C. to 35° C.). About 20% of the total amount of vinyl chloride/vinyl acetate to be added were emulsified therein and ethylene was empressed therein to a pressure of about 50 bar (in tests 1 to 20, 35 to 45 bar). The polymerization was started and controlled by adding a sodium formaldehyde sulfoxylate solution. About ½ hour after the start of the reaction, the monomers were added in doses, over a period lasting 4 to 9 hours, depending on the cooling power of the autoclave used. The ethylene pressure was kept at the desired, initially set value during this time. Thereafter, the pressure was released and unreacted monomers were removed by vacuum. The properties of the dispersions obtained as well as the ingredients charged are given in Table I.

EXAMPLES D27 to D32

General preparation of the dispersions for the additive Examples A27 to A32

The polyvinyl alcohol solution, the nonionic emulsifier indicated in Table I, the entire monomers, and the oxidant (t-butyl hydroperoxide, about 0.15%, based on the dispersion) were stirred into the charged water. The mixture was heated to 45° C. to 60° C. (50° C.) and the polymerization was started and controlled by adding a sodium formaldehyde sulfoxylate solution in doses. During the polymerization, the pressure dropped from about 2 bar to 0. Then the polymerization was continued for 1 to 2 hours until a constant solids content was obtained. During the polymerization the pH value was about 5 to 6. At the end t-butyl hydroperoxide (about 0.5%, based on the dispersion) was stirred in for the final polymerization. The properties of the dispersions obtained as well as the ingredients charged are given in Table I.

TABLE I

| Example Nr. | VC % Based on the monomers | VAc % Based on the monomers | E % Based on the monomers | VL % Based on the monomers | INV % Based on the monomers |
|---|---|---|---|---|---|
| 1 cpn | 25 | 62 | 13 | — | — |
| 2 cpn | 25 | 62 | 13 | — | — |
| 3 cpn | 25 | 62 | 13 | — | — |
| 4 cpn | 25 | 62 | 13 | — | — |
| 5 cpn | 25 | 62 | 13 | — | — |
| 6 cpn | 25 | 62 | 13 | — | — |
| 7 cpn | 25 | 62 | 13 | — | — |
| 8 cpn | 25 | 62 | 13 | — | — |
| 9 cpn | 25 | 62 | 13 | — | — |
| 10 | 25 | 62 | 13 | — | — |
| 11 | 25 | 62 | 13 | — | — |
| 12 | 25 | 62 | 13 | — | — |
| 13 | 25 | 62 | 13 | — | — |
| 14 cpn | 25 | 62 | 13 | — | — |
| 15 cpn | 25 | 62 | 13 | — | — |
| 16 | 24 | 60 | 16 | — | — |
| 17 | 26 | 61 | 13 | — | — |
| 18 cpn | 26 | 63 | 11 | — | — |
| 19 | 26 | 63 | 11 | — | — |
| 20 | 26 | 60 | 14 | — | — |
| 21 | 48 | 32 | 20 | — | — |
| 22 | 67 | 13 | 20 | — | — |
| 23 | 67 | 13 | 20 | — | — |
| 24 | 67 | 13 | 20 | — | — |
| 25 | 67 | 16 | 17 | — | — |
| 26 | 69 | 13 | 18 | — | — |
| 27 cpn | 25 | 50 | — | 25 | — |
| 28 cpn | 25 | 50 | — | 25 | — |
| 29 | 25 | 50 | — | 25 | — |
| 30 cpn | 20 | 40 | — | — | 40 |
| 31 cpn | 20 | 40 | — | — | 40 |
| 32 | 20 | 40 | — | — | 40 |

| Example Nr. | PVA1 Type | PVA1 % | Isotridecanol + 15EO Type | Isotridecanol + 15EO % | EO/PO Copolymer % |
|---|---|---|---|---|---|
| 1 cpn | 28/60 | 5 | 13/140 | 2 | — |
| 2 cpn | 28/60 | 5 | 13/140 | 2 | — |
| 3 cpn | 28/60 | 5 | 13/140 | 2 | — |
| 4 cpn | 28/60 | 5 | 13/140 | 2 | — |
| 5 cpn | 28/60 | 5 | 13/140 | 2 | — |
| 6 cpn | 28/60 | 5 | 13/140 | 2 | — |
| 7 cpn | 28/60 | 5 | 13/140 | 2 | 2(3) |
| 8 cpn | 28/60 | 5 | 13/140 | 2 | 2(3) |
| 9 cpn | 28/60 | 5 | 13/140 | 2 | 2(3) |
| 10 | 28/60 | 5 | 13/140 | 2 | — |
| 11 | 28/60 | 5 | 13/140 | 2 | — |
| 12 | 28/60 | 5 | 13/140 | 2 | — |
| 13 | 28/60 | 5 | 13/140 | 2 | — |
| 14 cpn | 28/60 | 5 | 13/140 | 2 | — |
| 15 cpn | 28/60 | 5 | 13/140 | 2 | — |
| 16 | 28/60 | 3.5 | 13/140 | 2.5 | — |
| 17 | 28/60 | 5 | 13/140 | 1 | — |
| 18 cpn | 28/60 | 3.5 | 13/140 | 2.5 | — |

TABLE I-continued

| | | | | | | |
|---|---|---|---|---|---|---|
| 19 | 28/60 | 3.5 | 13/140 | 2.5 | — | — |
| 20 | 7/140 | 7 | — | — | — | — |
| 21 | 5/196 | 5 | 13/140 | 2 | 2.3 | — |
| 22 | 5/200 | 6 | — | — | 2 | — |
| 23 | 5/200 | 6 | — | — | 2 | — |
| 24 | 5/200 | 6 | — | — | 2 | — |
| 25 | 5/200 | 6 | — | — | — | — |
| 26 | 6/65 | 6 | — | — | — | — |
| 27 cpn | 28/60 | 3.3 | — | — | 2.3 | 1$^{(4)}$ |
| 28 cpn | 28/60 | 3.3 | — | — | 2.3 | 1$^{(4)}$ |
| 29 | 28/60 | 3.3 | — | — | 2.3 | 1$^{(4)}$ |
| 30 cpn | 28/60 | 5 | — | — | — | — |
| 31 cpn | 28/60 | 5 | — | — | — | — |
| 32 | 28/60 | 5 | — | — | — | — |

| | Properties of dispersion | | |
|---|---|---|---|
| Example Nr. | Solids content % | Visc., CIII Rheo mPa's | LFT °C. |
| 1 cpn | 48.2 | 1120 | 5 |
| 2 cpn | 48.2 | 1120 | 5 |
| 3 cpn | 48.2 | 1120 | 5 |
| 4 cpn | 48.2 | 1120 | 5 |
| 5 cpn | 48.2 | 1120 | 5 |
| 6 cpn | 48.2 | 1120 | 5 |
| 7 cpn | 50.2 | 1120 | 6 |
| 8 cpn | 49.8 | 950 | 4 |
| 9 cpn | 50.2 | 1200 | 6 |
| 10 | 48.2 | 1120 | 5 |
| 11 | 48.2 | 1120 | 5 |
| 12 | 48.2 | 1120 | 5 |
| 13 | 48.2 | 1120 | 5 |
| 14 cpn | 48.2 | 1120 | 5 |
| 15 cpn | 48.2 | 1120 | 5 |
| 16 | 50 | 1450 | 1 |
| 17 | 50.5 | 1950 | 7.5 |
| 18 cpn | 50 | 4500 | 11 |
| 19 | 50 | 4500 | 11 |
| 20 | 51 | 950 | 14 |
| 21 | 51.8 | 1020 | 15 |
| 22 | 50.2 | 1830 | 21 |
| 23 | 50.2 | 1830 | 21 |
| 24 | 50.2 | 1830 | 21 |
| 25 | 50.5 | 1350 | 30 |
| 26 | 50 | 630 | 28 |
| 27 cpn | 51.9 | 510 | 16 |
| 28 cpn | 51.9 | 510 | 16 |
| 29 | 51.9 | 510 | 16 |
| 30 cpn | 51.4 | 2920 | 24.5 |
| 31 cpn | 51.4 | 2920 | 24.5 |
| 32 | 51.4 | 2920 | 24.5 |

Footnote for TABLE I
$^{(1)}$% data based on the resin content
$^{(2)}$With the polyvinyl alcohols (PVA1) The first number indicates the Hoeppler viscosity of a 4% solution in mPa's, the second number the saponification number.
$^{(3)}$Ethylene oxide/propylene oxide block copolymer with 20% ethylene oxide units
$^{(4)}$Ethylene oxide/propylene oxide block copolymer with 40% ethylene oxide units.
LFT = lowest film-forming temperature - the lowest temperature where the resin of the dispersion stills forms a film when dewatered.
cpn = comparison

EXAMPLE A1 to A32

The dispersion obtained in Examples D1 to D32 were mixed with varying amounts of dimethylpolysiloxane, ethylene oxide/propylene oxide copolymer and flame-hydrolyzed silicon dioxide. In each instance, the flame-hydrolyzed silicon dioxide was previously incorporated into the dimethylpolysiloxane. The subsequent addition to the dispersions are given in Table II.

TABLE II

| | Solid content | Subsequent additions to dispersions | |
|---|---|---|---|
| Example No. | of dispersion % | Silicone oil % | EO/PO Copolymer % |
| A1 cpn | 48.2 | 0.8$^{(2)}$ | — |
| A2 cpn | 48.2 | 0.4$^{(2)}$ | — |
| A3 cpn | 48.2 | 0.4$^{(2)}$ | 2$^{(3)(4)}$ |
| A4 cpn | 48.2 | 0.2$^{(2)}$ | 2$^{(3)(4)}$ |
| A5 cpn | 48.2 | 0.4$^{(2)}$ | 2$^{(5)(4)}$ |
| A6 cpn | 48.2 | 0.4$^{(6)}$ | 2$^{(5)(4)}$ |
| A7 cpn | 50.2 | 0.4$^{(6)}$ | — |
| A8 cpn | 49.8 | 0.4$^{(7)}$ | — |
| A9 cpn | 50.2 | 0.4$^{(2)}$ | — |
| A10 | 48.2 | 0.4$^{(6)}$ | 2$^{(3)(4)}$ |
| A11 | 48.2 | 0.2$^{(6)}$ | 1$^{(3)(4)}$ |
| A12 | 48.2 | 0.4$^{(6)}$ | 2$^{(3)(8)}$ |
| A13 | 48.2 | 0.4$^{(6)}$ | 2$^{(3)(9)}$ |
| A14 cpn | 48.2 | 0.4$^{(6)}$ | 2$^{(3)(10)}$ |
| A15 cpn | 48.2 | 0.4$^{(6)}$ | 2$^{(3)(11)}$ |
| A16 | 50 | 0.2$^{(6)}$ | 1$^{(3)(4)}$ |
| A17 | 50.5 | 0.4$^{(6)}$ | 2$^{(3)(4)}$ |
| A18 cpn | 50 | 0.4$^{(2)}$ | — |
| A19 | 50 | 0.4$^{(6)}$ | 2$^{(3)(4)}$ |
| A20 | 51 | 0.4$^{(6)}$ | 2$^{(3)(4)}$ |
| A21 | 51.8 | 0.4$^{(6)}$ | 2$^{(3)(4)}$ |
| A22 | 50.2 | 0.2$^{(6)}$ | 1$^{(3)(4)}$ |
| A23 | 50.2 | 0.2$^{(6)}$ | 1$^{(3)(4)}$ |
| A24 | 50.2 | 0.2$^{(6)}$ | 0.5$^{(3)(4)}$ |
| A25 | 50.5 | 0.2$^{(6)}$ | 1$^{(3)(4)}$ |
| A26 | 50 | 0.4$^{(6)}$ | 2$^{(3)(4)}$ |
| A27 cpn | 51.9 | 0.4$^{(2)}$ | — |
| A28 cpn | 51.9 | 0.4$^{(6)}$ | — |
| A29 | 51.9 | 0.4$^{(6)}$ | 2$^{(3)(4)}$ |
| A30 cpn | 51.4 | 0.4$^{(6)}$ | — |
| A31 cpn | 51.4 | 0.4$^{(2)}$ | — |
| A32 | 51.4 | 0.4$^{(6)}$ | 2$^{(3)(4)}$ |

Footnote for TABLE II
$^{(1)}$% data based on the resin content
$^{(2)}$Pure silicone anti-foam in the form of a 20% aqueous emulsion (with about 6% flame-hydrolyzed silica), an emulsion of a dimethylpolysiloxane having a viscosity of 500 mPa's
$^{(3)}$Mixed with the silicone anti-foam before addition.
$^{(4)}$Ethylene oxide/propylene oxide block copolymer with 20% ethylene oxide units; molecular weight.
$^{(5)}$Not mixed with silicone anti-foam before addition.
$^{(6)}$Pure silicone anti-foam (with about 6% flame-hydrolyzed, silica)
$^{(7)}$Mixed with the EO/PO copolymer emulsifier which was added before polymerization of D8.
$^{(8)}$Ethylene oxide/propylene oxide block copolymer with 10% ethylene oxide units; molecular weight
$^{(9)}$Ethylene oxide/propylene oxide block copolymer with 60% ethylene oxide units; molecular weight
$^{(10)}$Ethylene oxide polymer; molecular weight about 2000.
$^{(11)}$Propylene oxide polymer; molecular weight about 2000.

USE OF EXAMPLES A1 TO A32

A cement-sand mortar was mixed in a cement/sand/water ratio of 1:3:0.45. Thereafter 20%, by weight, based on the weight of the cement, of dispersion additives A1 to A32 were added. Before addition, the dispersion additives were subjected to shearing forces for 30 minutes at 3000 rpm. Thereafter the mortar with additives was stirred for 15 minutes and its spreading in centimeters according to DIN 1164 was determined, and, after setting, the content of air-filled pores was determined. The values obtained are given in Table III.

TABLE III

| After 30 minutes shearing of the dispersion and 15 minutes stirring of the mortar | | |
|---|---|---|
| Example Additive II. | Spreading in cm according to DIN 1164 | Air-filled Pores Content % |
| 1 cpn | 17.5 | 21 |
| 2 cpn | 17.5 | 23 |
| 3 cpn | 17 | 8.5 |
| 4 cpn | 17 | 16 |
| 5 cpn | 18 | 13.5 |
| 6 cpn | 18 | 21 |
| 7 cpn | 18.5 | 24 |

TABLE III-continued

After 30 minutes shearing of the dispersion and 15 minutes stirring of the mortar

| Example Additive II. | Spreading in cm according to DIN 1164 | Air-filled Pores Content % |
|---|---|---|
| 8 cpn | 19 | 26 |
| 9 cpn | 18 | 18 |
| 10 | 18 | 2.8 |
| 11 | 17.5 | 4.9 |
| 12 | 18.5 | 4.8 |
| 13 | 18 | 5.1 |
| 14 cpn | 19 | 25 |
| 15 cpn | 18.5 | 26 |
| 16 | 18.5 | 4.6 |
| 17 | 18 | 2.4 |
| 18 cpn | 14 | 10.8 |
| 19 | 16.5 | 3.5 |
| 20 | 17.5 | 4.3 |
| 21 | 17.5 | 4.8 |
| 22 | 17 | 3 |
| 23 | 17 | 3.3 |
| 24 | 18 | 4 |
| 25 | 17 | 3 |
| 26 | 16.5 | 3.5 |
| 27 cpn | 19 | 9 |
| 28 cpn | 18 | 21 |
| 29 | 18.5 | 3.5 |
| 30 cpn | 19 | 20 |
| 31 cpn | 19 | 14.5 |
| 32 | 17.5 | 4.9 |

The preceding specific embodiments are illustrative of the practice of the invention. It is to be understood however that other expedients known to those skilled in the art or disclosed herein, may be employed without departing from the spirit of the invention or the scope of the appended claims.

We claim:

1. An additive composition used in the preparation of low air pore, plastic-containing, hydraulically-setting binders consisting essentially of a mixture of (1) an aqueous copolymer dispersion having a solids content of between 30% and 65% by weight, a glass transition temperature of the solid copolymer of between −10° C. and +40° C., and a K-value of the solid copolymer of from 35 to 80, which aqueous copolymer dispersion being produced from monomer units of vinyl chloride, vinyl acetate and one or more additional copolymerizable monomers selected from the group consisting of ethylene, vinyl alkanoates having from 8 to 18 carbon atoms in the alkanoyl, and (meth)acrylic acid esters with alkanols having 3 to 8 carbon atoms, by free-radical polymerization in the presence of from 1.5% to 5% by weight of protective colloids and from 0 to 3% by weight of nonionic surface-active agents, both based on the dispersion, with (2) from 0.3% to 3% by weight, based on the mixture of a previously mixed substantially anhydrous defoamer mixture consisting of 5 to 50 parts out of 100 parts of a dimethyl polysiloxane with 50 to 1,000 mPa's, 1 to 10 parts out of 100 parts of a flame-hydrolyzed silicon dioxide, and 49 to 94 parts out of 100 parts of an ethylene oxide/propylene oxide block copolymer with a molecular weight of from 500 to 10,000 containing from 10% to 60% by weight of ethylene oxide units, wherein said dimethyl polysiloxane and said flame-hydrolyzed silicon dioxide are mixed together before addition of said block copolymer thereto.

2. In the production of plastic-containing hydraulically-setting binder which comprises mixing a hydraulically-setting material, fillers, water and a plastic dispersion and allowing the mixture to hydraulically set, the improvement consisting of using from 1% to 50% by weight, based on the hydraulically-setting material of the additive composition of claim 1 as said plastic dispersion.

* * * * *

UNITED STATES PATENT AND TRADEMARK OFFICE
CERTIFICATE OF CORRECTION

PATENT NO. : 4,263,191
DATED : April 21, 1981
INVENTOR(S) : HERBERT ECK ET AL.

It is certified that error appears in the above—identified patent and that said Letters Patent is hereby corrected as shown below:

Column 1, line 38: Delete "a-".

line 39: "erogel" should read -- aerogel --.

Column 4, line 32: Before "vinyl" please insert -- of --.

Signed and Sealed this

Sixteenth Day of February 1982

[SEAL]

Attest:

GERALD J. MOSSINGHOFF

Attesting Officer

Commissioner of Patents and Trademarks